(12) United States Patent
Luo

(10) Patent No.: US 7,840,229 B2
(45) Date of Patent: Nov. 23, 2010

(54) METHOD FOR MANAGING REQUESTS FOR MULTIPARTY SESSION SETUP ACCORDING TO DETERMINED RESOURCE ASSIGNMENT POLICY

(75) Inventor: Long Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 500 days.

(21) Appl. No.: 11/867,258

(22) Filed: Oct. 4, 2007

(65) Prior Publication Data
US 2008/0032729 A1 Feb. 7, 2008

Related U.S. Application Data

(63) Continuation of application No. PCT/CN2006/000614, filed on Apr. 6, 2006.

(30) Foreign Application Priority Data
Apr. 7, 2005 (CN) .................... 2005 1 0063240

(51) Int. Cl.
*H04W 4/08* (2009.01)
*H04W 4/10* (2009.01)
(52) U.S. Cl. .................... 455/518; 455/416
(58) Field of Classification Search .............. None
See application file for complete search history.

(56) References Cited
U.S. PATENT DOCUMENTS
7,580,375 B1 * 8/2009 Friedrich et al. ........ 455/416 X
FOREIGN PATENT DOCUMENTS
CN 1595887 A 3/2005

JP 2002-374286 A 12/2002
WO WO 2004/112335 A1 12/2004

OTHER PUBLICATIONS

Yu, F., et al., "Design of Floor Control Policy in Virtual Classroom," Computer Engineering, vol. 29, No. 4, Mar. 2003, pp. 176-178, China Academic Journal Electronic Publishing House. English abstract located on p. 176 of article.
Partial Translation of First Chinese Office Action of Chinese Application No. 2005/10063240.7, First Office Action of the State Intellectual Property Office of the PRC, 3 pages.

(Continued)

*Primary Examiner*—Philip J Sobutka
(74) *Attorney, Agent, or Firm*—Slater & Matsil, L.L.P.

(57) ABSTRACT

A method for managing communication resource assignment includes: determining a resource assignment policy based on information for requesting resource assignment policy in a session setup request for a multiparty communication service from a User Equipment, and assigning, according to the resource assignment policy, communication resources; A method for managing communication resource assignment includes: modifying a resource assignment policy based on information for requesting resource assignment policy in a session modification request for modifying a resource assignment policy and assigning, according to the modified resource assignment policy, the communication resources. A communication resource policy system is also provided. With the method and system above, the communication resources of multiparty communication services can be managed flexibly according to the resource assignment policies.

20 Claims, 11 Drawing Sheets

OTHER PUBLICATIONS

English Translation of the Written Opinion of the International Searching Authority, International Application No. PCT/CN2006/000614, 4 pages.

Feiyang, Y., et al., "Design of Floor Control Policy in Virtual Classroom," Computer Engineering, Mar. 2003, vol. 29, No. 4, pp. 177-178.

* cited by examiner

METHOD FOR MANAGING REQUESTS FOR MULTIPARTY SESSION SETUP ACCORDING TO DETERMINED RESOURCE ASSIGNMENT POLICY

FIELD OF THE INVENTION

The present invention relates to a communication resource assignment technology in communication systems, and particularly, to a method for managing communication resource assignment and a resource assignment policy system.

BACKGROUND OF THE INVENTION

Currently, the communication systems can provide various services accessed by individual users and group users, and the communication media employed in the services include: text, audio, video, and various multimedia combinations.

General communication services are mainly designed for individual users and usually provided for one or two user terminals. In the general communication services, the communication system functions in full duplex mode and communication resources are shared by all the participant users. For example, in voice communications of two users, both the two users may talk at the same time and the communication system mixes the voices of the two users. However, the mixing of the voices does not affect the quality of the communications because there are a small number of users in the communications.

However, the communication services for group users usually allow a group or multiple groups of users to communicate at the same time, and consequently the number of User Equipments (UEs) in the communication is large and the communication system has to manage the communication resource assignment for each user to guarantee the communication quality. For example, in a Push-to-talk over Cellular (PoC) service communication system, the PoC service communication system has to perform Floor Control among multiple users in a group conversation and perform a communication resource assignment policy that multiple users preempt the right to talk. Therefore, a user has to request the right to talk from the system, and the system assigns communication resources to a user who firstly requests the right to talk among all the users in the conversation, i.e., grants the user the right to talk. The system refuses the requests for the right to talk from the other users, i.e., refuses to assign communication resources to the other users. Therefore, the PoC service communication system transmits only the voice traffics of the user having the right to talk, and the user in the conversation cannot hear voices from the users having no right to talk.

The mechanism of the existing communication system for the communication resource assignment is not flexible for the communication services involving group users. As described above, the mechanism of communication resource assignment of the PoC service only covers the preemption of the right to talk. However, the mechanism of preempting the right to talk alone cannot bring satisfactory service experience to users in many cases. If the communication resources are assigned according to policies on the basis of the demands of users, more arranged group conversation styles may be provided to satisfy the demands of users in different types of group conversations. For example, the communication resource assignment policy may be: assigning the right to talk to different users in a sequence every 5 minutes. Therefore, the users will be enabled to talk one by one according to the sequence and each of the users has 5 minutes to talk. Besides the PoC service, other communication services involving group users also have similar problems at present. For example, in conference services involving multiple group users, communication resources used for video transmission are usually assigned through manually switching the video from one conference site to another, i.e., the communication resources cannot be assigned flexibly on the basis of the demands of users.

To sum up, in the current communication services involving group users, users and operators cannot configure communication resource assignment policies dynamically on the basis of the demands of the users and operators, and the systems of the communication services cannot flexibly manage the communication resource assignment either. As a result, the effect of the communication services is unsatisfactory, and the current resource assignment mechanism also limits the further development of the functions of the communication services described above.

SUMMARY OF THE INVENTION

In view of the above, the present invention provide a method for managing communication resource assignment and a resource assignment policy system, which are able to provide a communication resource assignment policy for a current service and to manage the communication resource assignment flexibly.

According to an embodiment, a method for managing communication resource assignment in a resource assignment policy system includes: determining a resource assignment policy based on information for requesting resource assignment policy in a session setup request for a multiparty communication service from a User Equipment, UE; and assigning, according to the resource assignment policy, communication resources to UEs of the multiparty communication service set up according to the session setup request.

According to an embodiment of the present invention, a method for managing communication resource assignment in a resource assignment policy system includes:

modifying a resource assignment policy based on information for requesting resource assignment policy in a session modification request for modifying a resource assignment policy in a multiparty communication service from a User Equipment, UE; and assigning the communication resources to UEs of the multiparty communication service according to the modified resource assignment policy.

According to an embodiment, a resource assignment policy system, configured in a communication system including a centralized session control unit and a media processing unit, includes:

a resource assignment policy provision subsystem, for providing a resource assignment policy based on information included in one of a session setup request and a session modification request from a User Equipment, UE, via the centralized session control unit for requesting resource assignment policy; and a resource assignment policy execution subsystem, for managing the media processing unit to assign the communication resources according to the resource assignment policy received from the resource assignment policy provision subsystem.

Therefore, the method for managing communication resource assignment and the resource assignment policy system provided by the present invention enable the communication system to select a resource assignment policy according to demands of the current service and to manage the communication resource assignment of the current service. Therefore, the resource assignment policies are diversified and good base is therefore laid for future extensions of communication services and for interworking between varieties of communication systems.

DETAILED DESCRIPTION OF THE INVENTION

Embodiments of the present invention are further described as follows in detail with reference to the accompanying drawings so as to make the technical solution and merits of the present invention more apparent.

According to the present invention, a method for managing communication resource assignment is provided, and the method includes: during the process of setting up a multiparty communication service, determining a resource assignment policy for the multiparty communication service, and assigning communication resources to users in the multiparty communication service according to the determined resource assignment policy. The multiparty communication service may be a PoC service, or a Message service, or a conference service.

Generally, there are two manners for determining the resource assignment policy corresponding to the multiparty communication service which is being set up. According to a first manner, the user initiating the multiparty communication service sends an indication to the network side and the network side determines the resource assignment policy according to the indication of the user. The indication of the user may be included in a session setup request from the user to the network side, and the present invention does not limit the manner for including the indication of the user. According to a second manner, the corresponding relations between multiparty communication service groups and resource assignment policies are set in advance on the network side, and the resource assignment policy corresponding to the multiparty communication service is determined according to the corresponding relations when the multiparty communication service is being set up. The method in embodiments of the present invention is mainly implemented in a server performing Controlling Function (CF) for a multiparty communication service on the network side, e.g., in the PoC server performing CF for the PoC service (PoC control server), or in the conference server providing CF for the conference service (the conference control server or conference focus).

Figure 1:
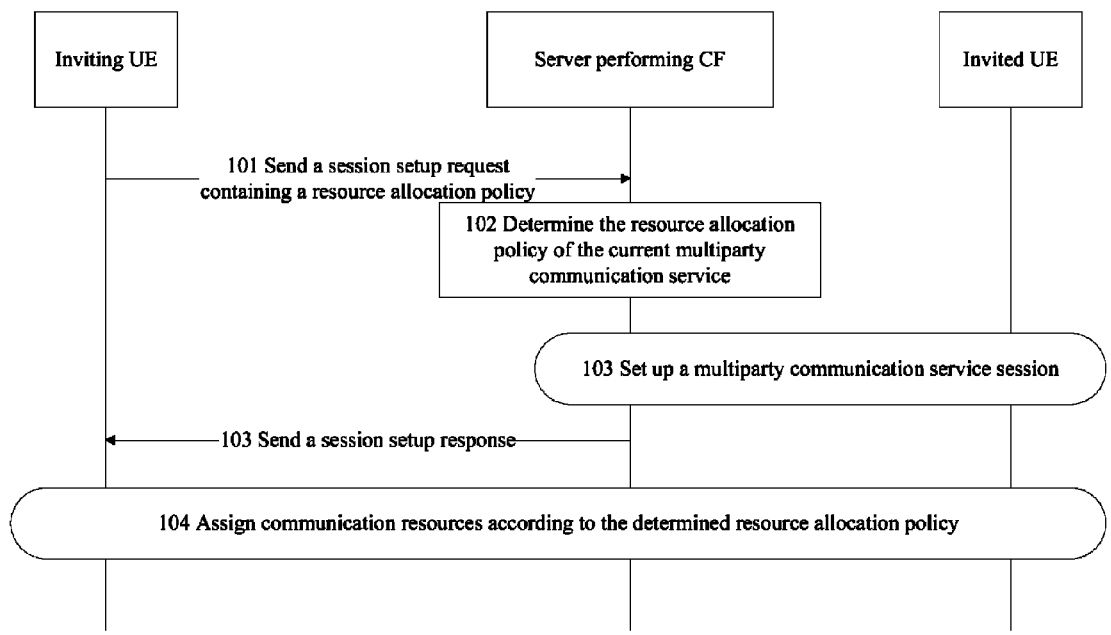
FIG. 1 is a flow chart of a method in accordance with an embodiment of the present invention.
Figure 2:
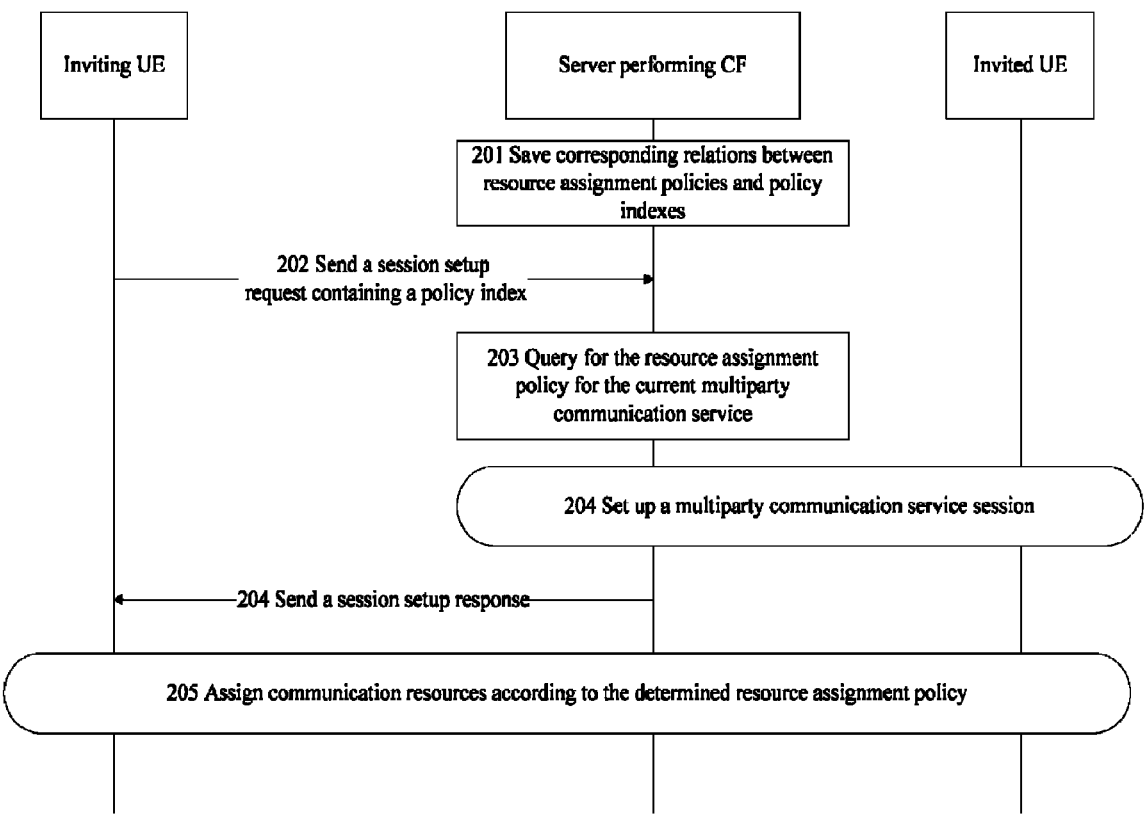
FIG. 2 is a flow chart of a method in accordance with an embodiment of the present invention.
Figure 3:
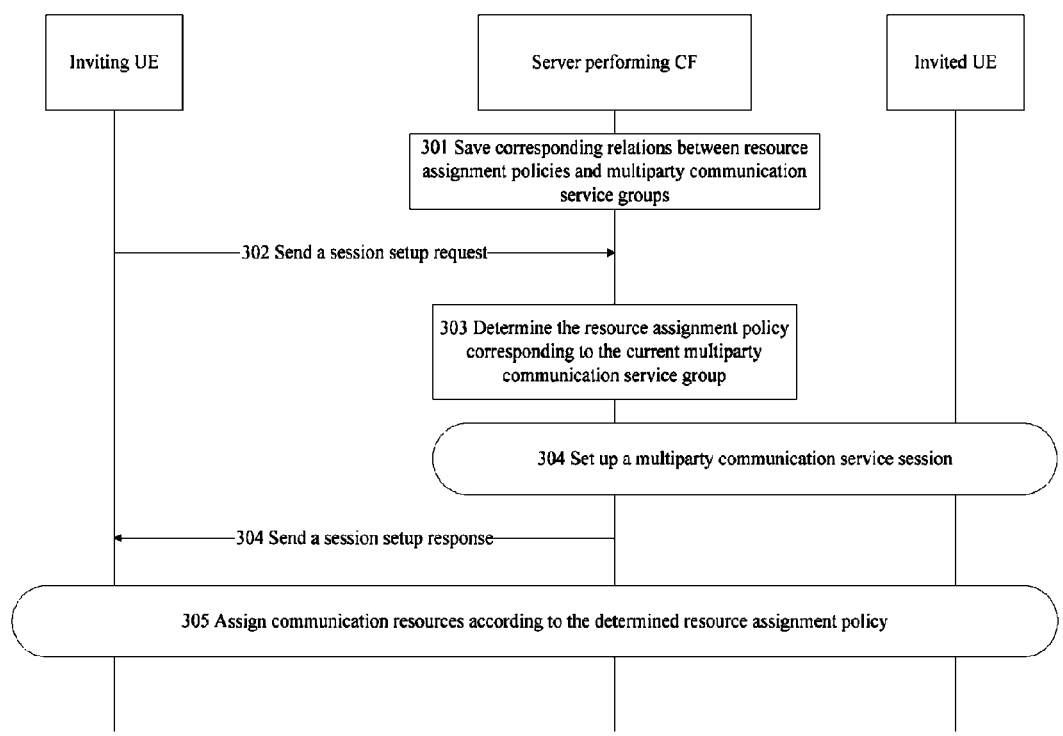
FIG. 3 is a flow chart of a method in accordance with an embodiment of the present invention.

FIGS. 1 to 3 show methods in accordance with three embodiments of the present invention respectively. The methods shown in FIGS. 1 and 2 are implemented in the first manner described above for determining a resource assignment policy, and the method shown in FIG. 3 is implemented in the second manner described above for determining a resource assignment policy. The three embodiments are explained in detail as follows.

FIG. 1 is a flow chart of a method in accordance with an embodiment of the present invention. In this embodiment, the resource assignment policy required by a user itself is included directly in a session setup request initiated by the user. As shown in FIG. 1, the method is described below.

In Action 101, an inviting UE sends a session setup request containing a resource assignment policy to a server performing CF. The session setup request may be performed by a SIP INVITE message.

In Action 102, the server performing CF obtains the resource assignment policy from the received session setup request and determines that the resource assignment policy is a resource assignment policy corresponding to a multiparty communication service which is being set up currently.

In Action 103, the server performing Controlling Function sets up sessions to the invited UEs in the multiparty communication service, and sends a session setup response to the inviting UE. The session setup response may be contained in an SIP 200 OK message.

In Action 104, upon setting up the multiparty communication service, the server performing CF assigns communication resources to the inviting UE and the invited UEs according to the resource assignment policy determined in Action 102.

How to assign the communication resources according to the resource assignment policy is not a technical problem of the present invention and can be realized in the prior art. Therefore, no further description is given.

In the embodiment shown in FIG. 1, the inviting UE may send parameters of the resource assignment policy along with the resource assignment policy, so that the server performing CF uses the received parameters of the resource assignment policy to assign the communication resources according to the resource assignment policy. The resource assignment policy may be configured as: the users of the current PoC service are granted the right to talk one by one in a sequence at a determined interval. Therefore, the server performing CF sends, according to the logic of the resource assignment policy, an indication to open the media transmission link of a UE and an indication to close the media transmission link of another UE at the determined interval, i.e., the server performing CF updates the communication resource assignment at the determined interval. The parameters of the resource assignment policy may include the determined interval, e.g., a parameter of the resource assignment policy is set to 5 minutes, and therefore the server performing CF updates the communication resource assignment every 5 minutes. Furthermore, the server performing CF may notify the calling/invited UE(s) (i.e. the calling and/or invited UE(s)) of information on the resource assignment policy after the resource assignment policy is determined. For example, the server performing CF notifies each user of the resource assignment policy corresponding to the current service, and further notifies each user of the operation guidelines based on the resource assignment policy for the users to request the right to talk. For example, the server performing CF may notify the UE, which is granted the right to talk, that communication resources have been assigned to the UE and the UE is allowed to talk, and notify the UE, from which the right to talk is withdrawn, that the communication resources have been assigned to another user and the UE should stop talking. The configuration of logic of the resource assignment policy, which resource assignment policy information to be notified, and how to re-assign the communication resources are not technical problems to be solved by the present invention, and can be realized by those skilled in the art in multiple manners, and therefore are not described in detail herein.

FIG. 2 is a flow chart of a method in accordance with an embodiment of the present invention. In this embodiment, the corresponding relations between resource assignment policies and policy indexes are set in advance on a server performing CF, and the policy index corresponding to the resource assignment policy required by a user is contained in the session setup request from the user. As shown in FIG. 2, the method is described below.

In Action 201, corresponding relations between resource assignment policies and policy indexes are set and saved in advance on a server performing CF.

In Action 202, an inviting UE sends to the server performing CF a session setup request containing a policy index.

In Action 203, the server performing CF fetches the policy index from the received session setup request, obtains a resource assignment policy corresponding to the policy index and determines that the obtained resource assignment policy is a resource assignment policy corresponding to the multiparty communication service which is being set up currently.

In Action 204, the server performing CF sets up sessions to the invited UEs in the current multiparty communication service and sends a session setup response to the inviting UE.

In Action 205, upon setting up the multiparty communication service, the server performing CF assigns communication resources to the inviting UE and the invited UEs according to the resource assignment policy determined in Action 203.

In the embodiment shown in FIG. 2, the inviting UE may send parameters of the resource assignment policy along with the policy index, so that the server performing CF may use the received parameters of the resource assignment policy to assign the communication resources according to the determined resource assignment policy. Furthermore, the server performing CF may notify the calling/invited UE(s) of the resource assignment policy information after the resource assignment policy is determined.

In the embodiments shown in FIGS. 1 and 2 respectively, the server performing CF determines the resource assignment policy according to the indication of the user. However, in some cases, the network side may be unable to support the resource assignment policy in the indication of the user. Therefore, after the server performing CF has determined the resource assignment policy indicated in the session setup request as shown in FIGS. 1 and 2, the method may further includes:

The network side determines whether the determined resource assignment policy is acceptable. If the determined resource assignment policy is acceptable, the communication resources are assigned according to the resource assignment policy. Otherwise, the server performing CF refuses to set up the multiparty communication service and terminates the process; in this case, the user re-initiates the process of setting up a multiparty communication service and sends another indication on the resource assignment policy until the server performing CF accepts the resource assignment policy indicated by the user, and then the multiparty communication service can be set up. In this embodiment, the server performing CF may not refuse to set up the multiparty communication service when the determined resource assignment policy is unacceptable; in such a case, the network side can directly adopt a default resource assignment policy set in advance, or the network side can negotiate with the user to obtain a resource assignment policy which both the network side and the user agree on. For example, the server performing CF may send to the inviting UE a resource assignment policy suggested by the server performing CF in a provisional response and the inviting UE determines whether to accept the suggested resource assignment policy according to the provisional response; and such a negotiation process is repeated until a resource assignment policy is agreed on. The negotiation method for obtaining a resource assignment policy by the user and the network side does not include technical problems of the present invention and may adopt the negotiation process in the prior art, the present invention does not limit the negotiation method and no further description of the negotiation is given herein, however, the negotiation process is covered in the protection scope of the present invention.

FIG. 3 is a flow chart of a method in accordance with an embodiment of the present invention. In this embodiment, the corresponding relations between resource assignment policies and multiparty communication service groups are set in advance on a server performing CF, and the session setup request sent by the user need not contain any resource assignment policy information. As shown in FIG. 3, the method is described below.

In Action 301, the corresponding relations between resource assignment policies and multiparty communication service groups are set and saved in advance on a server performing CF.

In Action 302, an inviting UE sends a session setup request to the server performing CF, the session setup request contains at least the service information of the current multiparty communication service, including a user identifier, a group identifier, etc.

In Action 303, the server performing CF determines the group of the current multiparty communication service according to the received session setup request, determines a resource assignment policy corresponding to the group, and sets the resource assignment policy as a resource assignment policy of the multiparty communication service being set up currently.

In Action 304, the server performing CF sets up sessions to the invited UEs in the current multiparty communication service and sends a session setup response to the inviting UE.

In Action 305, upon setting up the multiparty communication service, the server performing CF assigns communication resources to the inviting UE and the invited UEs according to the resource assignment policy determined in Action 303.

In the embodiment shown in FIG. 3, the inviting UE may send parameters of the resource assignment policy in the session setup request, so that the server performing CF uses the received parameters of the resource assignment policy to assign the communication resources according to the determined resource assignment policy. Furthermore, the server performing CF may notify the calling/invited UE(s) of the resource assignment policy information after the resource assignment policy is determined.

In the methods shown in FIGS. 1 to 3, the server performing CF may notify the users of resource assignment policy information according to subscriptions made by the users in advance. If a user has subscribed to the resource assignment policy information, the user is notified; if a user has not subscribed to the resource assignment policy information, the user may not be notified.

After the multiparty communication service is set up, a user may further dynamically modify the resource assignment policy of the current multiparty communication service. Specifically, the user initiating a process of modifying the current multiparty communication service session sends an indication to the network side, and the network side modifies the resource assignment policy according to the indication of the user. The indication of the user can be contained in a session modification request from the user to the network side, and the present invention does not limit the method for sending the indication of the user to the network side.

Figure 4:
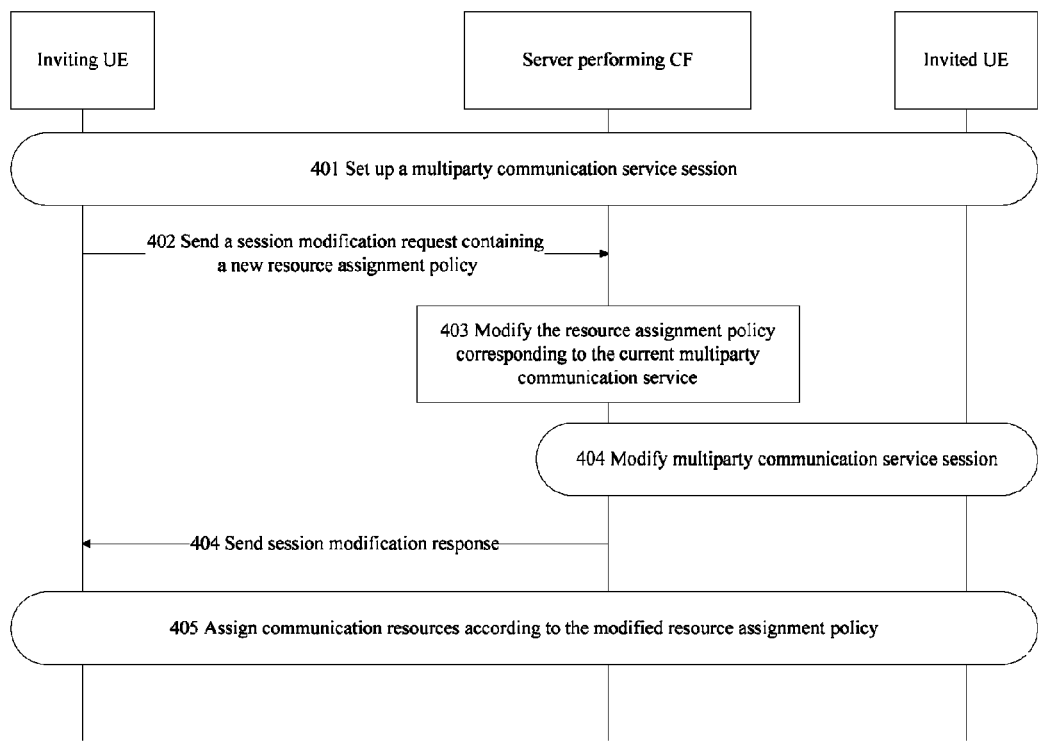
FIG. 4 is a flow chart illustrating the modification of a resource assignment policy in the method in accordance with the embodiment of the present invention shown in FIG. 1.

FIG. 4 is a flow chart illustrating the modification of a resource assignment policy in the method in accordance with the embodiment of the present invention shown in FIG. 1. In this embodiment, a user includes a new resource assignment policy required by the user into a session modification request. As shown in FIG. 4, the modification of a resource assignment policy is described below.

In Action 401, sessions are set up between UEs in a multiparty communication service.

In Action 402, the inviting UE sends a session modification request containing a new resource assignment policy to the server performing CF. The session modification request can be contained in an SIP UPDATE message or an SIP REINVITE message.

It should be noted that, in the session modification process, the inviting UE is the UE which initiates the session modification process.

In Action 403, the server performing CF fetches the new resource assignment policy from the received session modification request and sets the fetched new resource assignment policy as a modified resource assignment policy corresponding to the current multiparty communication service.

In Action 404, the server performing CF modifies sessions to the invited UEs in the current multiparty communication service and sends a session setup response to the inviting UE.

In Action 405, upon modifying the sessions of the current multiparty communication service, the server performing CF restarts to assign communication resources to the inviting UE and the invited UEs according to the modified resource assignment policy determined in Action 403.

In the embodiment shown in FIG. 4, the inviting UE may send a session modification request with parameters of the new resource assignment policy, possibly along with the new resource assignment policy, so that the server performing CF uses the parameters of the new resource assignment policy to assign the communication resources according to the new resource assignment policy. Furthermore, the server performing CF may notify the calling/invited UE(s) of the information on the updated resource assignment policy when the resource assignment policy is refreshed.

Figure 5:
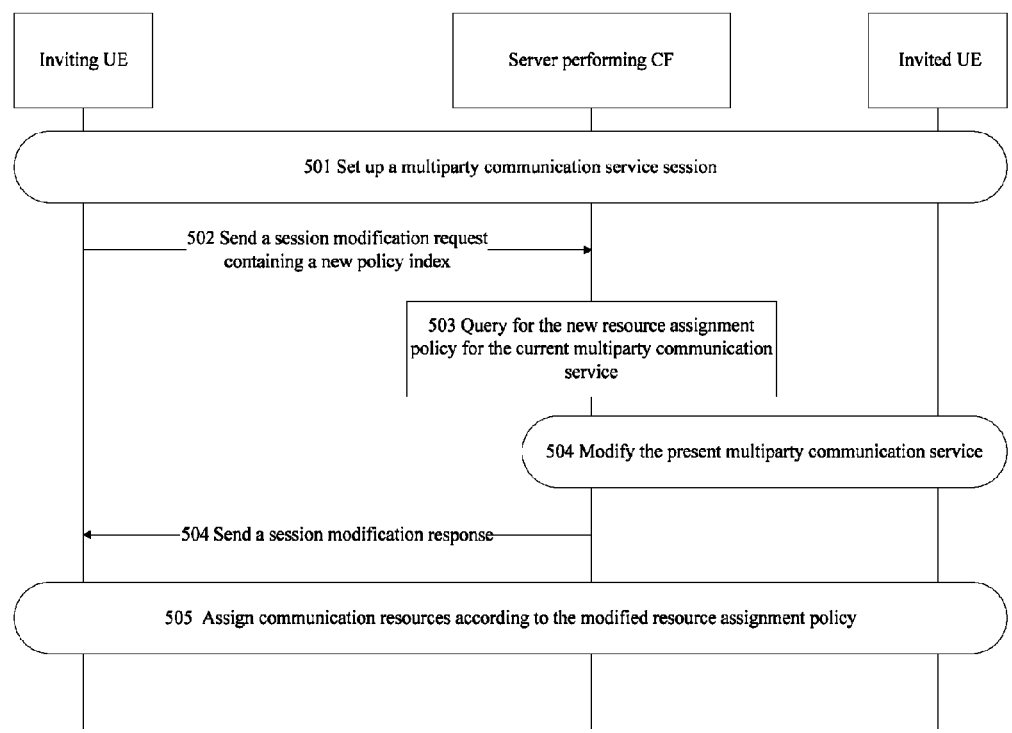
FIG. 5 is a flow chart illustrating the modification of a resource assignment policy in the method in accordance with the embodiment of the present invention shown in FIG. 2.

FIG. 5 is a flow chart illustrating the modification of a resource assignment policy in accordance with the embodiment of the present invention shown in FIG. 2. In this embodiment, a user includes a new policy index of a new resource assignment policy required by the user into a session modification request. As shown in FIG. 5, the modification of a resource assignment policy is described below.

In Action 501, sessions are set up between UEs in a multiparty communication service, and corresponding relations between resource assignment policies and policy indexes are set and saved in advance on the server performing CF.

In Action 502, the inviting UE sends to the server performing CF a session modification request containing a new policy index.

In Action 503, the server performing CF fetches the new policy index from the received session modification request, obtains a resource assignment policy corresponding to the new policy index, and sets the obtained resource assignment policy as a modified resource assignment policy corresponding to the current multiparty communication service.

In Action 504, the server performing CF modifies sessions to the invited UEs in the current multiparty communication service and sends a session setup response to the inviting UE.

In Action 505, upon modifying the sessions in the multiparty communication service, the server performing CF restarts to assign communication resources to the inviting UE and the invited UEs according to the modified resource assignment policy determined in Action 503.

In the embodiment shown in FIG. 5, the inviting UE may send parameters of the new resource assignment policy along with the new policy index of the new resource assignment policy, so that the server performing CF uses the received parameters of the new resource assignment policy to assign the communication resources according to the modified resource assignment policy. Further, the server performing CF may notify the calling/invited UE(s) of the information on the modified resource assignment policy after the resource assignment policy is modified.

In embodiments shown in FIGS. 4 and 5, the server performing CF modifies the resource assignment policy according to the indication of the user, however, in some cases, the network side may be unable to support the resource assignment policy indicated in the indication of the user. In such a case, after the server performing CF has determined the new resource assignment policy indicated in the session modification request, the method as shown in FIGS. 4 and 5 may further includes:

The network side determines whether the determined new resource assignment policy is acceptable. If the determined new resource assignment policy is acceptable, the server performing CF adopts the new resource assignment policy as the modified resource assignment policy and assigns the communication resources according to the modified resource assignment policy. Otherwise, the server proving CF refuses to modify the current multiparty communication service and terminates the process; and the user re-initiates the session modification process of the multiparty communication service, and sends another indication on the resource assignment policy until the server performing CF accepts the new resource assignment policy indicated by the user, and then the multiparty communication service can be modified. Alternatively, when the server performing CF cannot accept the determined new resource assignment policy, the server performing CF may not refuse to modify the current multiparty communication service, and instead, the network side may negotiate with the user to obtain a resource assignment policy supported by both the network side and the user.

Figure 6:
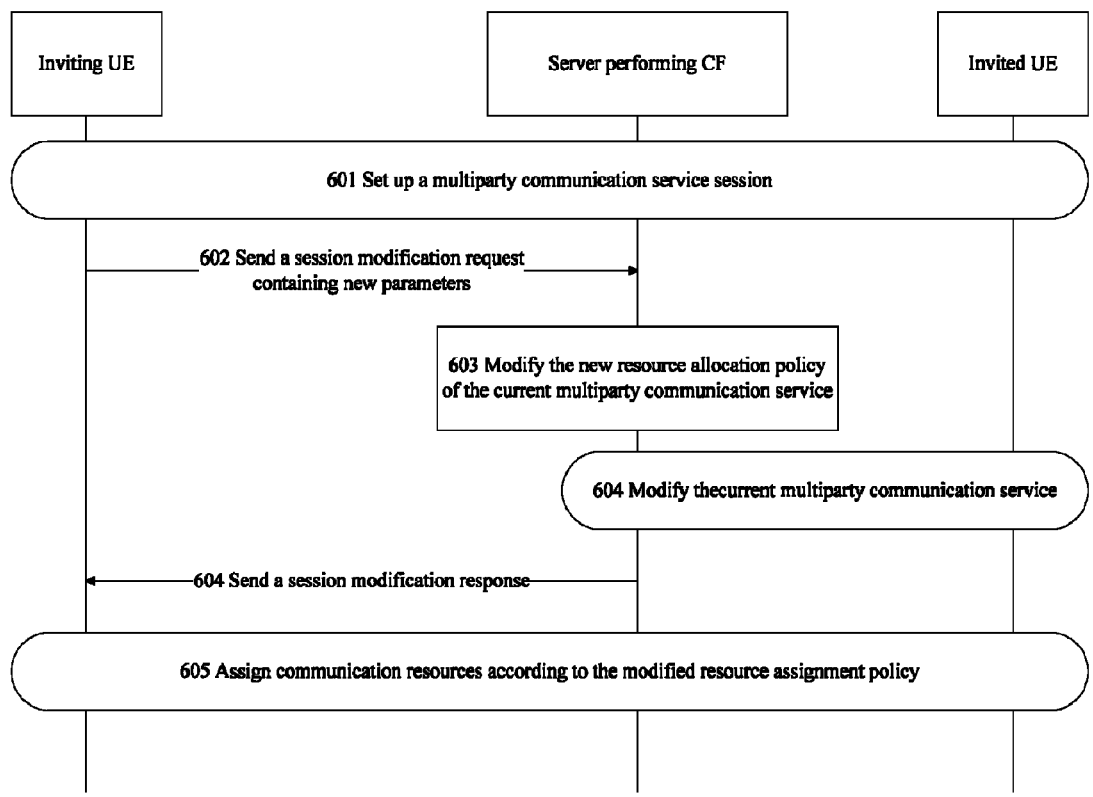
FIG. 6 is a flow chart illustrating the modification of a resource assignment policy in the method in accordance with the embodiment of the present invention shown in FIG. 3.

FIG. 6 is a flow chart illustrating the modification of a resource assignment policy in accordance with the embodiment of the present invention shown in FIG. 3. In this embodiment, new parameters of a new resource assignment policy required by a user are included in a session modification request initiated by the user. As shown in FIG. 6, the modification of a resource assignment policy is described below.

In Action 601, sessions are set up between UEs in a multiparty communication service.

In Action 602, the inviting UE sends to the server performing CF a session modification request containing new parameters of the resource assignment policy.

In Action 603, the server performing CF fetches the new parameters of the resource assignment policy from the received session modification request, replaces the original parameters of the resource assignment policy by the new parameters, and determines that the resource assignment policy with the new parameters is the modified resource assignment policy.

In Action 604, the server performing CF modifies sessions to the invited UEs in the current multiparty communication service and sends a session setup response to the inviting UE.

In Action 605, upon modifying the sessions in the multiparty communication service, the server performing CF starts to assign communication resources to the inviting UE and the invited UEs according to the modified resource assignment policy determined in Action 603.

In embodiments shown in FIGS. 4 to 6, the server performing CF modifies the resource assignment policy according to the indication of the user, however, in some cases, the network side may be unable to support the resource assignment policy indicated in the indication of the user. Thus, after the server performing CF has determined the new resource assignment policy indicated in the session modification request, the method shown in FIGS. 4 to 6 further includes:

The network side determines whether the determined new resource assignment policy is acceptable. If the determined new resource assignment policy is acceptable, the server performing CF adopts the new resource assignment policy as the modified resource assignment policy and assigns the communication resources according to the modified resource assignment policy. Otherwise, the server refuses the modification of the current multiparty communication service and terminates the process; and the user re-initiates the session modification process of the multiparty communication service, and sends another indication on the resource assignment policy until the server performing CF accepts the new resource assignment policy indicated by the user, and then the multiparty communication service can be modified. Alternatively, when the server performing CF cannot accept the determined new resource assignment policy, the server performing CF may not refuse to modify the current multiparty communication service, instead, the network side may negotiate with the user to obtain a resource assignment policy supported by both the network side and the user.

In the method shown in FIGS. 4 to 6, the server performing CF may notify the users of the information on the modified resource assignment policy according to the subscriptions made by the users in advance. If a user has subscribed to the resource assignment policy information, the user would be notified. If a user has not subscribed to the resource assignment policy information, the user may not be notified.

In the above modification process of a resource assignment policy, when the resource assignment policy has been modified, the server performing CF starts to assign the communication resources of the current multiparty communication service according to the modified resource assignment policy. However, the server performing CF may not re-assign the communication resources of the current multiparty communication service according to the modified resource assignment policy, but to save the corresponding relation between the modified resource assignment policy and the current multiparty communication service group. When the multiparty communication service group sets up a new multiparty communication service next time, the server performing CF assigns the communication resources according to the modified resource assignment policy. Further, when the corresponding relations between different multiparty communication service groups and resource assignment policies are set in advance on the server performing CF, the resource assignment policy corresponding to the current multiparty communication service group can also be modified after the current multiparty communication service is terminated (i.e. in the non-service period), and the modification process is similar to that shown in FIGS. 4 to 6, except that the UE does not send a new resource assignment policy or a new policy index in a session modification request, but logs in to the server performing CF to modify the resource assignment policy through a Web page or other means. The corresponding relations between the multiparty communication service groups and the resource assignment policies may be saved in a dedicated server instead of the server performing CF. The dedicated server is connected to the server performing CF and is dedicated to saving the resource assignment policies. For example, the dedicated server may be an Extensible Markup Language (XML) Document Management Server (XDMS), and a user may log in to the dedicated server to modify or set a resource assignment policy. Upon modifying the resource assignment policy, the server performing CF may notify the modified resource assignment policy to all users of the group or the users who have subscribed to the resource assignment policy information.

Embodiments of the present invention also provide a resource assignment policy system and a method for managing communication resource assignment based on the resource assignment policy system. According to an embodiment, a resource assignment policy system is configured in a communication system, and the resource assignment policy system is configured to save resource assignment policies and fetch a resource assignment policy according to the request for the setup process of the current multiparty communication service. The resource assignment policy system is further configured to manage the communication resource assignment of a media processing unit in the communication system according to the resource assignment policy. In order to achieve the functions of the resource assignment policy system, the resource assignment policy system includes at least: a resource assignment policy provision system and a resource assignment policy execution subsystem. The resource assignment policy provision system saves resource assignment policies and sends to the resource assignment policy execution subsystem a resource assignment policy according to a request for fetching a resource assignment policy from a centralized session control unit in the communication system. The resource assignment policy execution subsystem sends a resource assignment indication to a media processing unit in the communication system according to the received resource assignment policy in order to manage the communication resource assignment of the current multiparty communication service.

An interface for exchanging resource assignment policy information may be added between the resource assignment policy provision system and the operation and administration system of the communication system, so that a user and an operator may configure the resource assignment policies flexibly. Through the operation and administration system, the operator may create, modify or delete the resource assignment policies saved in the resource assignment policy provision system. Then, an interface for exchanging resource assignment policy information may be added between the resource assignment policy provision system and a UE so that a user may create, modify or delete the resource assignment policies saved in the resource assignment policy provision system through the UE. Furthermore, resource assignment policy synchronization is needed between the communication system and an external communication system interworking with the communication system. For example, when a user of a group in a PoC service communication system joins a group session through the service network of an external communication system, the resource assignment policy corresponding to the group in the PoC service communication system has to be copied to the external communication system to achieve resource assignment policy synchronization. Concerning the need for resource assignment policy synchronization, the resource assignment policy provision system may further interact with the external communication system to exchange resource assignment policies, and update the resource assignment policies saved in the resource assignment policy provision system according to the received resource assignment policies.

To sum up, the resource assignment policy control group may further interact with the operation and administration system, and/or the UE, and/or the external communication system to exchange resource assignment policies. The resource assignment policy control group may update the resource assignment policies saved in the resource assignment policy database group according to the received resource assignment policies. The communication system in this disclosure refers to the communication system where the resource assignment policy system of the present invention is located, the operation and administration system in this disclosure refers to the operation and administration system of the communication system, and the external communication system in this disclosure refers to an external communication system interworking with the communication system.

The number of resource assignment policies processed by the whole communication system is very large and the resource assignment policy provision system is configured not only to save the resource assignment policies, but also to process the received request for fetching a resource assignment policy and to receive/send a large number of resource assignment policies. Therefore, the resource assignment policy provision system usually includes two parts: a resource assignment policy database group for saving resource assignment policies, and a resource assignment policy control group for processing the request for fetching a resource assignment policy and exchanging resource assignment policies.

The technical problem to be solved by the present invention is the communication resource assignment in a multiparty communication service involving group users, and the PoC service is a typical multiparty communication service; therefore, the system and method of the present invention is described in details with reference to a PoC service communication system as an example.

Figure 7:
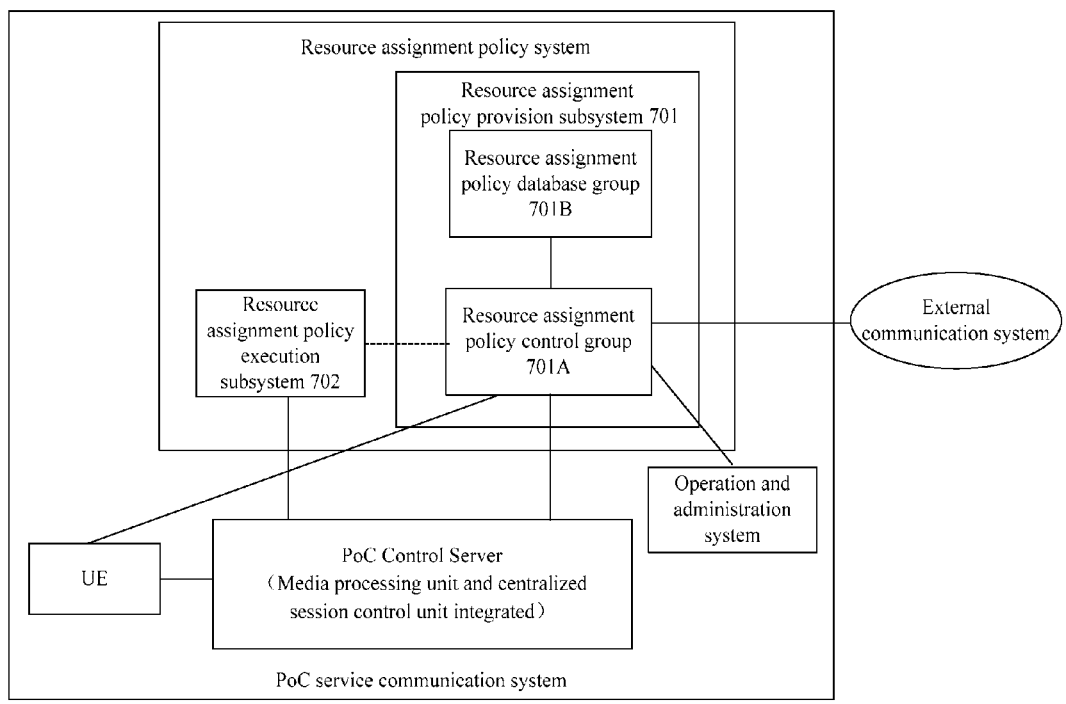
FIG. 7 is a schematic diagram illustrating a structure of a resource assignment policy system in accordance with an embodiment of the present invention.

FIG. 7 is a schematic diagram illustrating a structure of a resource assignment policy system in accordance with an embodiment of the present invention. As shown in FIG. 7, the resource assignment policy system is configured in the PoC service communication system, and the resource assignment policy system includes a resource assignment policy provision system 701 and a resource assignment policy execution subsystem 702. The resource assignment policy provision system 701 further includes: a resource assignment policy control group 701A and a resource assignment policy database group 701B. Besides the resource assignment policy system, the PoC service communication system further includes User Equipment (UE) and PoC control server. One PoC service session has one and only one PoC control server, i.e., the home PoC server of the group administrator of the current PoC service, and the media processing unit and the centralized session control unit are both integrated into the PoC control server. The UE which initiates the current PoC service sends a session setup request to the centralized session control unit in the PoC control server, and the centralized session control unit initiates calls to invited UEs. When the PoC service has been set up, the media processing unit in the PoC control server copies and distributes the media streams of the current PoC service. Because the centralized session control unit and the media processing unit are both integrated into the PoC control server, the PoC control server represents the centralized session control unit and the media processing unit, and the connection between the media processing unit and the centralized session control unit is not shown in FIG. 7. The connection between the media processing unit and the centralized session control unit is a part of common knowledge in the field and will not be described herein. The PoC control server herein is the PoC server providing Controlling Function in the PoC service.

The centralized session control unit in the PoC control server sends, when the current PoC service is being set up (e.g., upon receiving a session setup request from the UE), a request for fetching a resource assignment policy to the resource assignment policy control group 701A. The resource assignment policy control group 701A fetches a corresponding resource assignment policy from the resource assignment policy database group 701B and sends the resource assignment policy to the resource assignment policy execution subsystem 702 through the centralized session control unit. The resource assignment policy control group 701A further interacts with the UE, the operation and administration system and the external communication system to exchange resource assignment policies, and updates the resource assignment policies saved in the resource assignment policy database group 701B according to the resource assignment policies received from the UE, the operation and administration system or the external communication system. The resource assignment policy execution subsystem 702 sends, to the media processing unit in the PoC control server, the resource assignment policy according to a resource assignment indication, and thus controls the communication resource assignment performed by the media processing unit.

It should be noted that there may be two manners for sending a resource assignment policy. According to a first manner, the resource assignment policy control group 701A sends the received resource assignment policy to the centralized session control unit first, and the centralized session control unit sends the resource assignment policy to the resource assignment policy execution subsystem 702. According to a second manner, the resource assignment policy control group 701A sends the received resource assignment policy directly to the resource assignment policy execution subsystem 702.

As can be seen from the above, with the resource assignment policy system, the communication resource assignment can be managed dynamically during the setup process of the multiparty communication service through a proper resource assignment policy obtained according to the demands of the user. Furthermore, a user and an operator may create a new resource assignment policy through the operation and administration system, and modify or delete the saved resource assignment policies. And the PoC service communication system can synchronize the resource assignment policies with the resource assignment policies of the external communication system.

FIG. 7 only shows the basic structure of the system in accordance with an embodiment of the present invention. In practical applications, a large number of UEs and PoC control servers may set up sessions at the same time. Therefore, the resource assignment policy control group usually includes one or more (i.e., one or multiple) control modules, the resource assignment policy database group usually includes one or more databases, and the resource assignment policy execution subsystem usually includes one or more execution modules. Each of the databases is connected to one or more control modules, each of the control modules is connected to one or more centralized session control units in the PoC control servers, and each of the execution modules is connected to one or more media processing units in the PoC control servers. The operation and administration system and the external communication system are respectively connected to a control module. A centralized session control unit may send the request for fetching a resource assignment policy to the control module connected to the centralized session control unit. The control module queries the database (s) connected to the control module according to the request for fetching a resource assignment policy to obtain a resource assignment policy. And the control module sends, to the execution module corresponding to the current PoC service, the resource assignment policy directly. Or, the control module sends, to the execution module corresponding to the current PoC service, the resource assignment policy through the centralized session control unit. While synchronizing the resource assignment policies with the PoC service communication system, the external communication system interacts with the control module to exchange resource assignment policies. While creating, modifying and deleting resource assignment policies, the operation and administration system also interacts with the control module to exchange resource assignment policies, and the control module updates the resource assignment policies saved in the database(s) connected to the control module according to the received resource assignment policies.

In such cases, there may be multiple networking manners for the resource assignment policy system in accordance with an embodiment of the present invention. For example, each of the control modules may be connected to all the centralized session control units in the PoC service communication system to guarantee that all the centralized session control units may send varieties of requests for fetching a resource assignment policy to corresponding control modules. Preferably, two networking manners can be used for achieving better performance. According to a first networking manner, one or more proxy control modules are added into the resource assignment policy control group and each of the proxy control modules is connected to one or more centralized session control units and one or more control modules. Furthermore, each of the proxy control modules is also connected to the UE(s), and/or the operation and administration system and/or the external communication system. And the control modules interact with entities outside the resource assignment policy control group through the proxy control modules. The addresses of the control modules in the resource assignment policy control group are invisible to the entities outside the resource assignment policy control group, and the proxy control modules determine routing of the control modules, thus the system stability can be guaranteed. According to a second networking manner, a centralized session control unit is bound with one unique control module, and each of the control modules may be bound with one or more centralized session control units, therefore a centralized session control unit interacts with the control module bound to the centralized session control unit itself. Each of the control modules is further connected to the UE(s), and/or the operation and administration system and the external communication system so as to exchange resource assignment policies. The networking manner provides a simpler network structure, and is applicable to relative small-scale communication systems. The networking structure of the system adopting either of the two networking manners above and the process of the method based on the system in accordance with an embodiment of the present invention are further described.

Figure 8:
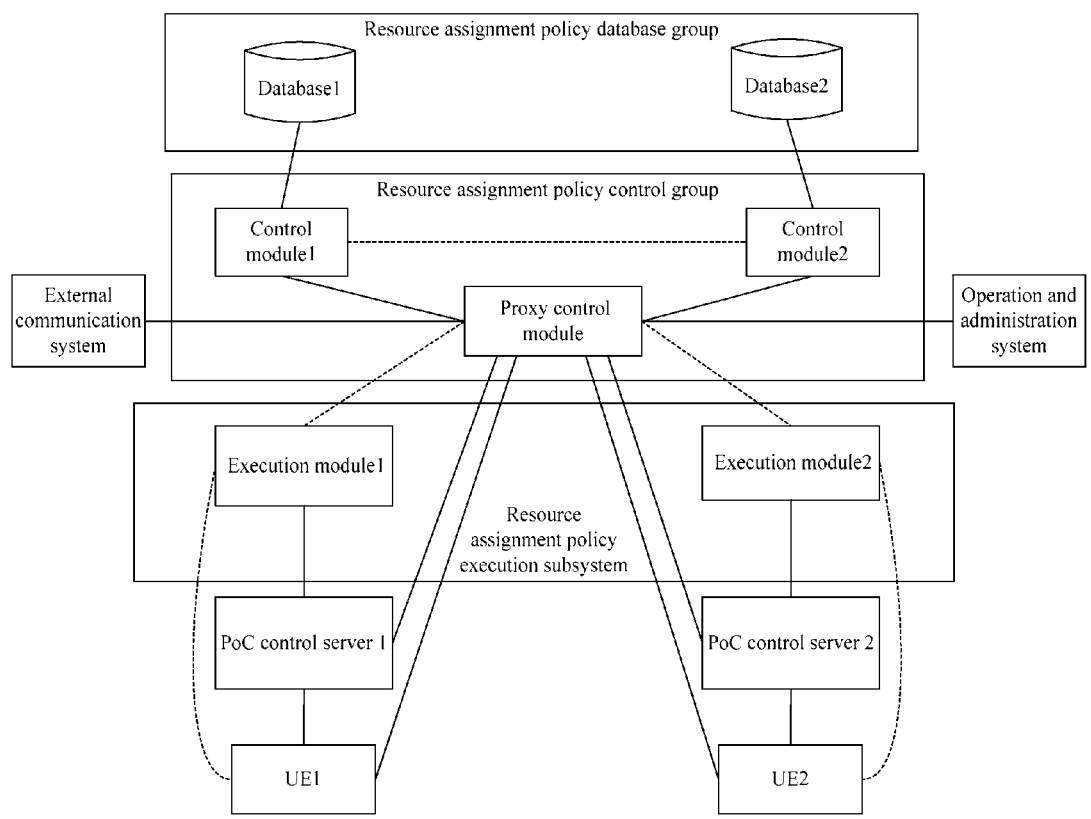
FIG. 8 is a schematic diagram illustrating a networking structure of the system in accordance with an embodiment of the present invention.

FIG. 8 is a schematic diagram illustrating a networking structure of the system in accordance with an embodiment of the present invention, and the resource assignment policy system adopts the first networking manner. According to the first networking manner, one or more proxy control modules can be set and each of the one or more proxy control modules is usually connected to one or more centralized session control units and control modules. In this embodiment, the networking structure is described with reference to an example that a proxy control module is connected to two control modules and two centralized session control units. Different control modules may be connected to the same or different databases, and different media processing units may be connected to the same or different execution modules. In this embodiment, the two control modules are connected to different databases and the two media processing units corresponding to the two centralized session control units respectively are connected to different execution modules. In the PoC service communication system, for one session, the centralized session control unit and the corresponding media processing unit which processes the voice traffics of the session are both integrated into the PoC control server of the current PoC service. Therefore, the two centralized session control units and the two corresponding media processing units are integrated respectively into two PoC control servers. For a simpler illustration, the two centralized session control units and the two media processing units are not shown in FIG. 8, but only the two PoC control servers are shown, which include the centralized session control units and the media processing units respectively.

As shown in FIG. 8, in a resource assignment policy control group in accordance with an embodiment of the present invention, the resource assignment policy control group includes: a proxy control module, control module 1 and control module 2. The resource assignment policy database group includes: database 1 connected to the control module 1 and database 2 connected to the control module 2. The resource assignment policy execution subsystem includes execution module 1 and execution module 2. Outside the resource assignment policy system in accordance with an embodiment of the present invention, there are UE1 and UE2, PoC control server 1 connected to the UE1 and PoC control server 2 connected to the UE2, the operation and administration system and the external communication system.

The centralized session control unit in the PoC control server 1 receives a session setup request from the UE1, and the centralized session control unit in the PoC control server 2 receives a session setup request from the UE2. Both centralized session control units send requests for fetching a resource assignment policy to the proxy control module. The proxy control module sends the requests for fetching a resource assignment policy to the control module 1 and control module 2 respectively. According to the received requests for fetching a resource assignment policy, the control module 1 and control module 2 fetch resource assignment policies respectively from the database 1 connected to the control module 1 and the database 2 connected to the control module 2. The control module 1 and control module 2 send to the proxy control module the resource assignment policies. The proxy control module sends the resource assignment policies to the centralized session control units in the PoC control server 1 and the PoC control server 2 respectively. The centralized session control units in the PoC control server 1 and the PoC control server 2 respectively send the received resource assignment policies to the execution module 1 and execution module 2 which are connected to the centralized session control units respectively. The execution module 1 and execution module 2 send resource assignment indications to the media processing units in the PoC control server 1 and the PoC control server 2 in order to manage the communication resource assignment in the PoC service session process. The PoC control server 1 and the PoC control server 2 are connected to the execution module 1 and the execution module 2 respectively.

The proxy control module further interacts with the UE1, UE2, the operation and administration system and the external communication system to exchange resource assignment policies. Through the proxy control module, a user using the UE1 or UE2 and an operator using the operation and administration system may update the resource assignment policies, e.g., create, modify or delete the resource assignment policies. The external communication system can, through the proxy control module, interact with the databases connected to the control modules to synchronize the resource assignment policies in the external communication system with the resource assignment policies in the current PoC service communication system.

The process of updating, by the UE1, UE2 and the operation and administration system through the proxy control module, the resource assignment policies saved in the database connected to the control module is described below. The UE1, UE2 or the operation and administration system creates a new resource assignment policy and inputs the new resource assignment policy into the proxy control module, indicates the address of the control module corresponding to the new resource assignment policy so that the proxy control module can send the new resource assignment policy to the control module. The proxy control module sends the new resource assignment policy to the control module, and the control module copies the new resource assignment policy received into the database connected to the control module. Or, The UE1, UE2 or the operation and administration system may send a configuration command to instruct the proxy control module to fetch a resource assignment policy from a specified control module, and process (e.g. modify) the resource assignment policy, send the modified resource assignment policy to the specified control module through the proxy control module. The specified control module updates, according to the modified resource assignment policy, the database connected to the specified control module so as to modify the resource assignment policy saved in the database. Alternatively, the UE1, UE2 or the operation and administration system may send a configuration command to instruct the proxy control module to delete a specified resource assignment policy of a specified control module. The proxy control module sends a deletion indication to the specified control module, and the specified control module deletes the specified resource assignment policy from the database connected to the specified control module.

The process of exchanging resource assignment policies through the proxy control module between the external communication system and the database connected to the control module is described below. The external communication system sends the resource assignment policies of the external communication system to the proxy control module, and indicates a control module corresponding to the resource assignment policies. The proxy control module forwards the resource assignment policies to the indicated control module, and the indicated control module copies the resource assignment policies into the database connected to the indicated control module. Alternatively, the external communication system may request, through the proxy control module, to copy resource assignment policies from the current PoC service communication system, and indicate a control module from which the resource assignment policies would be copied. The proxy control module instructs the control module to fetch the resource assignment policies from the database connected to the control module, and the control module sends the resource assignment policies to the external communication through the proxy control module. Therefore, the synchronization of resource assignment policies is achieved.

The centralized session control unit in the PoC control server has the highest priority for the session control, thus the centralized session control unit can temporarily manage the communication resource assignment on demand at any time. For example, the centralized session control unit may terminate the current PoC service, or temporarily grant a user the right to talk, etc. Therefore, in practical applications, a communication interface is usually set between the centralized session control unit and the execution module to manage the operations of the execution module, for example, the operation of pausing or continuing with the execution of the resource assignment policy. In the transmission process of a resource assignment policy shown in FIG. 8, through the communication interface between the centralized session control unit and the execution module, the transmission of the resource assignment policy is realized from the proxy control module to the centralized session control unit and further to the execution module. Obviously, the proxy control module may send a resource assignment policy directly to the execution module corresponding to the current PoC service. In this case, a communication interface should be added between the execution module and the proxy control module, and the centralized session control unit in the PoC control server should include the address of the execution module corresponding to the current PoC service into the request for fetching a resource assignment policy sent to the proxy control module. Thus the proxy control module can send the resource assignment policy directly to the execution module. Therefore, an interface from the proxy control module to the execution module 1 and an interface from the proxy control module to execution module 2 may be added into the system shown in FIG. 8 to implement the transmission of a resource assignment policy.

Further, the execution module may further send resource assignment notifications to UE(s) while sending a resource assignment indication to the media processing unit in the PoC control server, so that better performance can be obtained in the process of managing the communication resource assignment. For example, the execution module may notify a user that the user may or may not talk at present, or notify a user when the user can talk. Therefore a communication interface between the execution module 1 and UE1, and a communication interface between the execution module 2 and UE2 may be added into the networking structure shown in FIG. 8 for the transmission of the resource assignment notifications.

Furthermore, different control modules may need to synchronize resource assignment policies between each other; therefore, communication interfaces between different control modules are needed for exchanging the resource assignment policies. As shown in FIG. 8, the control module 1 and control module 2 may be connected, in such a case, the control module 1 can fetch resource assignment policies from the database 1 connected to the control module 1, and send the fetched resource assignment policies to the control module 2. The control module 2 can thus update the database 2 connected to the control module 2 according to the resource assignment policies received from the control module 1, i.e., copies the resource assignment policies from the database 1 into the database 2 to achieve resource assignment policy synchronization. The resource assignment policies in the database 2 connected to the control module 2 can also be copied into the database 1 connected to the control module 1 through a similar process. In this manner a session accessing both the control module 1 and the control module 2 may use all resource assignment policies in both the database 1 and database 2, and it is convenient for the extension and share of resource assignment policies in the whole communication system.

FIG. 8 illustrates the networking structure of the system in accordance with an embodiment of the present invention with only two UEs, two corresponding PoC control servers, two execution modules, a proxy control module, two control modules and two databases. However, with respect to a PoC session setup process initiated by one UE, the UE corresponds to only one PoC control server, one execution module, one proxy control module, one control module and one database. The session setup processes initiated by different UEs are independent of each other. The method provided by an embodiment of the present invention is explained hereinafter by taking a PoC session setup process initiated by one UE as an example.

Figure 9:
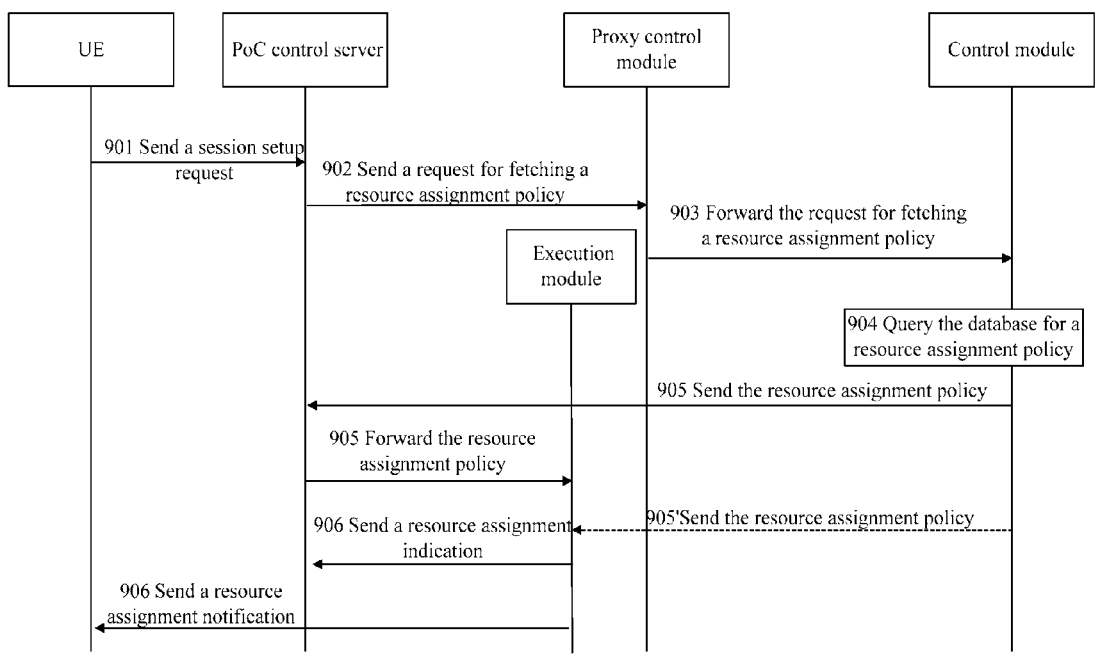
FIG. 9 is a flow chart of a method based on the networking structure shown in FIG. 8 in accordance with an embodiment of the present invention.

FIG. 9 is a flow chart of a method based on the networking structure shown in FIG. 8 in accordance with an embodiment of the present invention. As shown in FIG. 9, the method is described below.

In Action 901, a UE sends a session setup request to the centralized session control unit in a PoC control server of the session that is being set up, the session setup request includes service information such as a group identifier or a user identifier. The SIP INVITE request would be used to request session establishment.

In Actions 902-903, the centralized session control unit in Action 901 sends a request for fetching a resource assignment policy to a corresponding control module through a proxy control module according to the received session setup request.

The proxy control module may send the request for fetching a resource assignment policy to the control module in two manners.

According to a first manner, the request for fetching the resource assignment policy is routed to the control module according to the address of the control module in the request for fetching a resource assignment policy. The address of the control module is usually the domain name of the control module.

The UE may include the address of the control module into the session setup request. The centralized session control unit in the PoC control server may include the address of the control module in the session setup request into the request for fetching a resource assignment policy, and send the request for fetching a resource assignment policy to the proxy control module. Or, the centralized session control unit in the PoC control server may determine the address of the control module corresponding to the current PoC service according to the service information such as the group identifier in the received session setup request. And the centralized session control unit in the PoC control server may include the determined address of the control module into the request for fetching a resource assignment policy, and send the request for fetching a resource assignment policy to the proxy control module. To determine the address of the control module according to the service information, the centralized session control unit may obtain, according to the service information such as the group identifier, the address of the control module set in the group information in advance. Or the centralized session control unit may determine, according to the predefined configurations of the centralized session control unit, the address of the control module corresponding to the group identifier of the current PoC service. In a word, there are multiple manners for determining the address of the control module corresponding to the current PoC service, and the present invention does not limit the manners.

According to a second manner for sending the request for fetching a resource assignment policy, the address of the control module corresponding to the current PoC service is determined according to the service information in the request for fetching a resource assignment policy. For example, the address of the control module corresponding to the service information such as the group identifier is determined according to the predefined configurations, and the request for fetching a resource assignment policy is routed to the control module according to the address of the control module.

In Action 904, the control module in Action 903 queries, according to the request for fetching a resource assignment policy, the database connected to the control module for the resource assignment policy corresponding to the current PoC service.

The control module may obtain the resource assignment policy according to the request for fetching a resource assignment policy in two manners.

According to a first manner, the corresponding relations between policy indexes and resource assignment policies are set in the database, and the control module queries the database for the resource assignment policy according to the policy index in the request for fetching a resource assignment policy.

The UE may include the policy index in the session setup request and the centralized session control unit forwards the policy index to the control module in the request for fetching a resource assignment policy. Or, the centralized session control unit determines the policy index corresponding to the current PoC service according to the service information in the session setup request. For example, the centralized session control unit obtains the policy index set in the group information in advance according to the service information such as the group identifier. For example, the centralized session control unit determines the policy index corresponding to the group identifier according to the predefined configurations of the centralized session control unit. There are multiple manners for determining the policy index and the present invention does not limit the manners.

According to a second manner, the corresponding relations between the resource assignment policies and the service information are set in the database, and the service information is the service information of multiparty communication services which the resource assignment policies may be applicable to. The control module queries the database for the resource assignment policy according to the service information in the request for fetching a resource assignment policy.

The database not only saves resource assignment policies, but also maintains the attributes of the resource assignment policies, e.g., application range of a resource assignment policy, whether the resource assignment policy is editable, whether the resource assignment policy can be published, and identifiers of users who can edit the resource assignment policy. The application range mainly describes the group sessions to which the resource assignment policy is applicable, i.e., the corresponding relations between the resource assignment policy and different group identifiers. Therefore, a resource assignment policy applicable to the current service can be obtained by querying the database on the basis of the service information. Obviously, multiple resource assignment policies may be applicable to one service and the control module can select a resource assignment policy according to a predefined selection logic, e.g., select according to the priority levels of resource assignment policies. The process of selecting a specific resource assignment policy does not include technical problems concerned by the present invention and will not be described in detail herein.

In Action 905, the control module sends, through the proxy control module, the resource assignment policy received in Action 904 to the centralized session control unit in the PoC control server. The centralized session control unit further sends the resource assignment policy to the execution module corresponding to the current PoC service. The execution module is the execution module connected to the media processing unit used for processing the current PoC service. The address of the media processing unit and the address of the execution module connected to the media processing unit are set in the centralized session control unit in advance, so that the centralized session control unit can send the resource assignment policy to the execution module.

Further, as shown in FIG. 8, the resource assignment policy can also be sent from the control module to the execution module through the proxy control module. In such a case, the request for fetching a resource assignment policy in Action 902 should contain the address of the execution module so that the proxy control module may send the resource assignment policy to the execution module according to the address of the execution module. And Action 905 is accordingly replaced by Action 905'. In Action 905', the control module sends the resource assignment policy to the proxy control module, and the proxy control module may send the resource assignment policy directly to the execution module according to the address of the execution module in the request for fetching a resource assignment policy in Action 902.

In Action 906, the execution module sends a resource assignment indication to the media processing unit in the PoC control server according to the logic described in the received resource assignment policy. The media processing unit can assign the communication resources of media transmission in the current PoC service according to the resource assignment indication from the execution module. At the same time, the execution module sends a resource assignment notification to the UE(s) in the current PoC service to notify each UE user whether the current communication resources are occupied, whether communication resources are assigned to the UE user and whether the UE user has the right to talk.

The resource assignment policy may be configured that: the users of the current PoC service are granted the right to talk one by one in a sequence at an interval of 5 minutes. Hence the execution module sends, according to the logic of the resource assignment policy, an indication to open a media transmission link of a UE and an indication to close a media transmission link to another UE at an interval of 5 minutes, i.e., updates the communication resource assignment in the media processing unit every 5 minutes. At the same time, the execution module may send a resource assignment notification to a UE to which the right to talk is granted, notifying the UE that communication resources are assigned to the UE and the UE may talk. And the execution module sends another resource assignment notification to a UE which should stop talking, notifying the UE that communication resources are assigned to another UE and the UE should stop talking. And the execution module also sends resource assignment notifications to other UEs to notify the UEs which user starts talking. The logics of resource assignment policies, the resource assignment notifications sent by the execution module and the process of re-assigning the communication resources by the media processing unit according to the resource assignment indication from the execution module are not covered by the present invention, can be provided by those skilled in the art through multiple ways, and therefore will not be described in detail herein.

Figure 10:
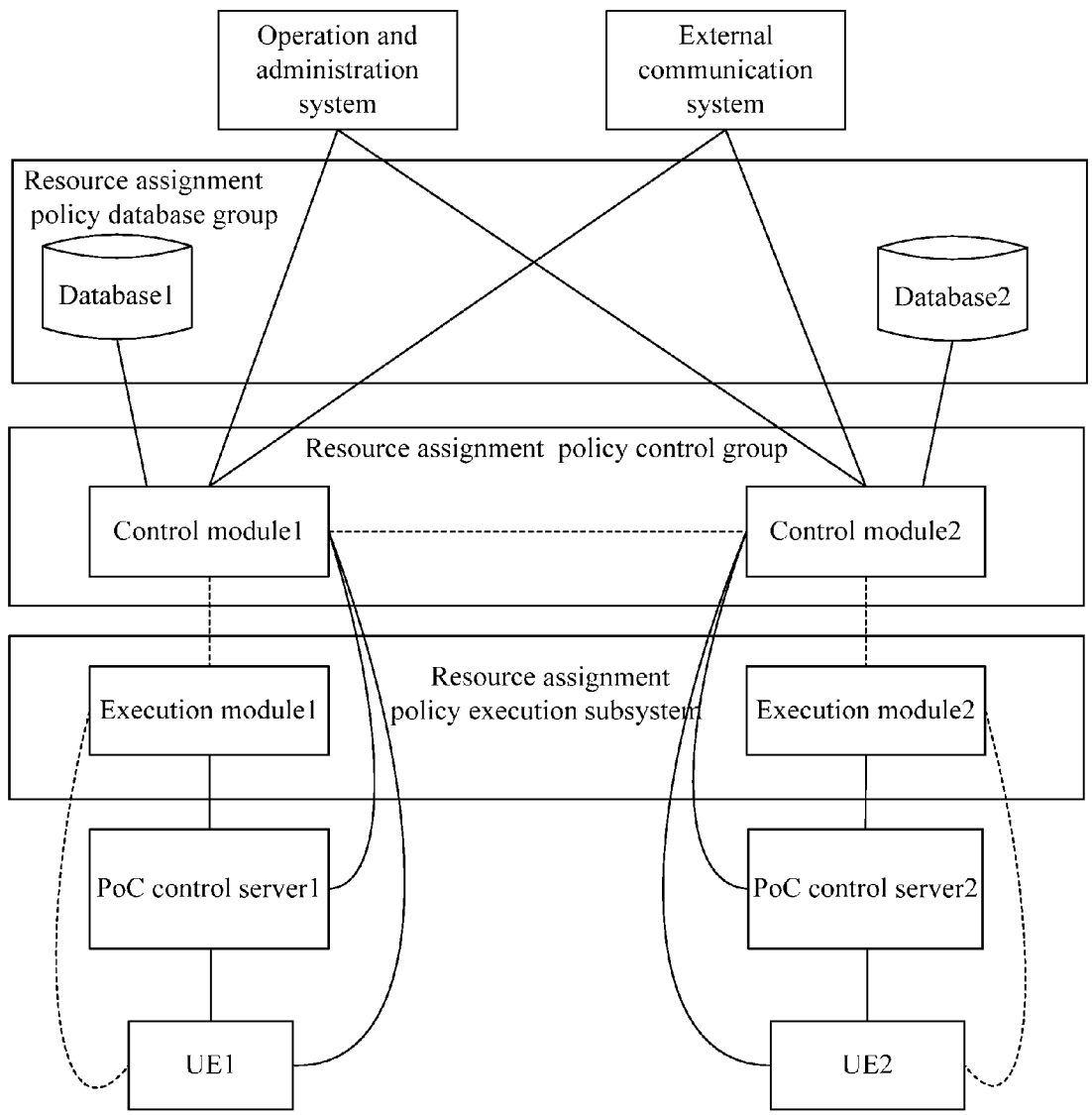
FIG. 10 is a schematic diagram illustrating a networking structure of the system in accordance with an embodiment of the present invention.

FIG. 10 is a schematic diagram illustrating a networking structure of the system in accordance with an embodiment of the present invention. The system in FIG. 10 adopts the second networking manner, and each control module is bound with one or more centralized session control units. This embodiment is explained with an example that a control module is bound with only one centralized session control unit, and different control modules are connected to different databases in the embodiment, the two media processing units corresponding to the centralized session control units are also connected to different execution units. In the PoC service communication system, the centralized session control unit and corresponding media processing unit are both integrated into the PoC control server of the current session. However, for a simpler illustration, FIG. 10 does not show the centralized session control unit and the media processing unit, but only shows the PoC control server including the centralized session control unit and the media processing unit.

As shown in FIG. 10, in a resource assignment policy system in accordance with an embodiment of the present invention, the resource assignment policy control group includes: control module 1 and control module 2; the resource assignment policy database group includes: database 1 connected to the control module 1 and database 2 connected to the control module 2; and the resource assignment policy execution subsystem includes: execution module 1 and execution module 2. Outside the resource assignment policy system in accordance with an embodiment of the present invention, the drawing also shows UE1 and UE2, PoC control server 1 connected to the UE1 and PoC control server 2 connected to the UE2, the operation and administration system and the external communication system. The PoC control server 1 is bound with the control module 1 and the PoC control server 2 is bound with the control module 2.

The centralized session control unit in the PoC control server 1 receives a session setup request from the UE 1, and sends a request for fetching a resource assignment policy to the control module 1 bound with the centralized session control unit in the PoC control server 1. The centralized session control unit in the PoC control server 2 receives a session setup request from the UE2, and sends a request for fetching a resource assignment policy to the control module 2 bound with the centralized session control unit in the PoC control server 2. The control module 1, according to the request for fetching a resource assignment policy, fetches corresponding resource assignment policies from database 1 connected to the control module 1. The control module 2, according to the request for fetching a resource assignment policy, fetches corresponding resource assignment policies from database 2 connected to the control module 2. And then the control module 1 and control module 2 send the resource assignment policies to the centralized session control units in PoC control server 1 and PoC control server 2 respectively. The centralized session control units in PoC control server 1 and PoC control server 2 further send the received resource assignment policies to the execution module 1 and execution 2 connected to the centralized session control units respectively. The execution module 1 and the execution 2 send, according to the received resource assignment policies, resource assignment indications respectively to the media processing units in the PoC control server 1 and PoC control server 2 which are connected to the execution modules respectively in order to manage the communication resource assignment in the session process.

The UE1 and UE2 are further connected to the control module 1 and control module 2 respectively to exchange resource assignment policy information. The control module 1 is further connected to the operation and administration system and the external communication system to exchange resource assignment policy information, so is the control module 2. A user with the UE1 or the UE2, or an operation with the operation and administration system may update the resource assignment policies in the database 1 or the database 2 through the connected control module 1 or control module 2, e.g. create, modify or delete the resource assignment policies. The external communication system can also perform resource assignment policy synchronization with the current PoC service communication system through the control module 1 or control module 2.

The process of updating, by the UE1, UE2 or the operation and administration system through the connected control module 1 or control module 2, the resource assignment policies saved in the database 1 or database 2 is described below. The UE1, UE2 or the operation and administration system creates a new resource assignment policy and inputs the new resource assignment policy to the connected control module 1 or control module 2. The control module 1 or control module 2 copies the received resource assignment policy into the database 1 or database 2. Or, the UE1, UE2 or the operation and administration system sends a configuration command to indicate the connected control module 1 or control module 2 to fetch a resource assignment policy, processes (e.g. modifies) the resource assignment policy, and sends the processed resource assignment policy to the control module 1 or control module 2. The control module 1 or control module 2 updates the database 1 or database 2 according to the processed resource assignment policy, so as to modify the resource assignment policy saved in the database 1 or database 2. Or, the UE1, UE2 or the operation and administration system may send a configuration command to indicate the control module 1 or the control module 2 to delete a specified resource assignment policy, and the control module 1 or the control module 2 deletes the specified resource assignment policy from the database 1 or database 2.

The process of interacting between the external communication system and the database 1 or the database 2 to exchange a resource assignment policy through the control module 1 or control module 2 connected to the external communication system is described below. The external communication system may send the resource assignment policies of the external communication system to the control module 1 or the control module 2. The control module 1 or the control module 2 copies the resource assignment policies into the database 1 or database 2. Or, the external communication system may request copying resource assignment policies from the control module 1 or control module 2. The control module 1 or control module 2 may fetch resource assignment policies from the database 1 or database 2, and export the fetched resource assignment policies to the external communication system. Therefore the resource assignment policy synchronization is achieved.

Similar to the process in FIG. 8, in the transmission process of a resource assignment policy shown in FIG. 10, the resource assignment policy is transmitted from a control module to a centralized session control unit, and further to an execution module through a communication interface between the centralized session control unit and the execution module. Alternatively, the control module may send a resource assignment policy directly to an execution module corresponding to the current PoC service, in this case, a communication interface should be added between the execution module and the control module, and the request for fetching a resource assignment policy sent by the centralized session control unit in the PoC control server should contain the address of the execution module corresponding to the current PoC service. Thus, the control module can send the resource assignment policy directly to the execution module corresponding to the current PoC service according to the address of the execution module. Therefore an interface between the control module 1 and the execution module 1, and an interface between the control module 2 and the execution module 2 can be added into the system in FIG. 10 for the transmission of resource assignment policies.

Similarly, the execution module may further send resource assignment notifications to UE(s) while sending the resource assignment indication to the media processing unit in the PoC control server, so that better performance can be obtained in the process of managing the communication resource assignment and greater convenience can be brought to a user. Therefore, a communication interface between the execution module 1 and UE1 and a communication interface between the execution module 2 and UE2 can be added into the networking structure shown in FIG. 10 for the transmission of resource assignment notifications.

Further, a communication interface between control modules is also needed for resource assignment policy exchange and resource assignment policy synchronization. As shown in FIG. 10, the control module 1 and the control module 2 may be connected to each other, and the control module 1 can fetch resource assignment policies from the database 1 connected to the control module 1 and send the fetched resource assignment polices to the control module 2. The control module 2 can thus update the database 2 connected to the control module 2 according to the resource assignment policies received from the control module 1, and the control module 2 copies the resource assignment policies from the database 1 into the database 2. The resource assignment policies in the database 2 connected to the control module 2 can also be copied into the database 1 connected to the control module 1 through a similar process. Therefore, the application scope of the resource assignment policies in the whole communication system is broadened and the resource assignment policies can be shared by more PoC service sessions.

FIG. 10 illustrates the networking structure of the system in accordance with an embodiment of the present invention with only two UEs, two corresponding PoC control servers and two control modules bound with the PoC control servers, two execution modules, and two databases. However, one PoC session setup process initiated by a UE corresponds to only one PoC control server, one execution module, one control module and one database, and the session setup processes of different UEs are independent of each other. The method provided by embodiments of the present invention is further explained as follows with an example of one PoC session setup process initiated by one UE.

Figure 11:
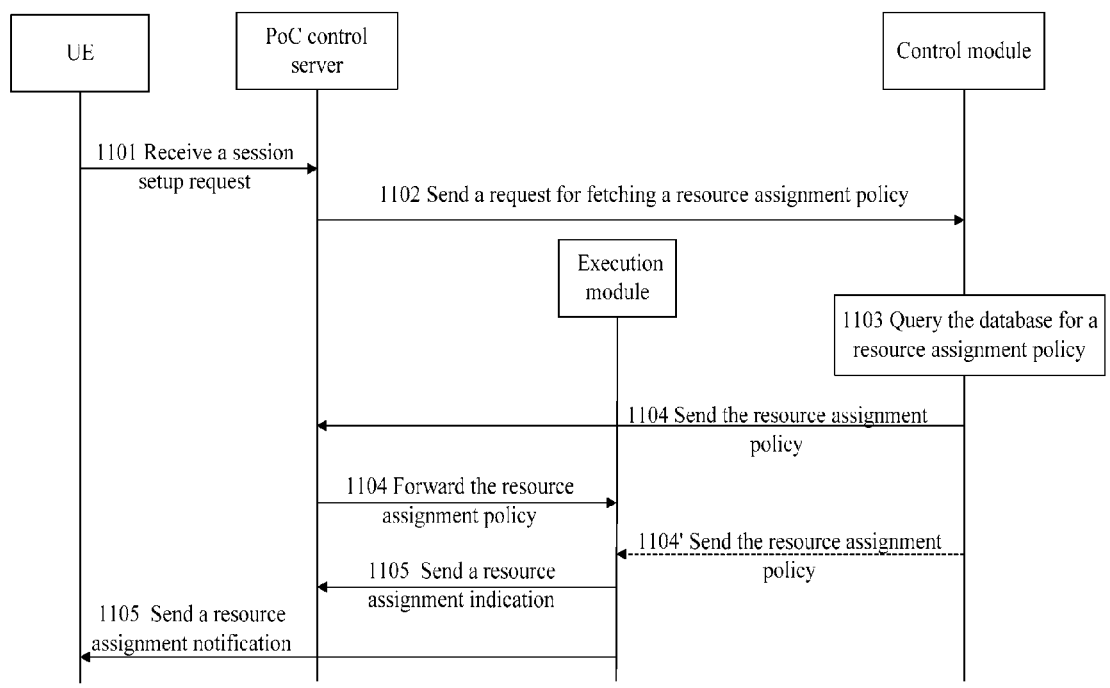
FIG. 11 is a flow chart of a method based on the networking structure shown in FIG. 10 in accordance with an embodiment the present invention.

FIG. 11 is a flow chart of a method based on the networking structure shown in FIG. 10 in accordance with an embodiment the present invention. As shown in FIG. 11, the method is described below.

In Action 1101, a UE sends a session setup request to the centralized session control unit in a PoC control server of the session that is being set up, and the session setup request contains service information such as a group identifier and a user identifier.

In Action 1102, the centralized session control unit in Action 1101 sends a request for fetching a resource assignment policy to the control module bound with the centralized session control unit. The address of the control module bound with the centralized session control unit is saved in the centralized session control unit in advance.

In Action 1103, the control module in Action 1102 queries, according to the received request for fetching a resource assignment policy, the database connected to the control module for the resource assignment policy corresponding to the current session. The manner for obtaining the resource assignment policy according to the request for fetching a resource assignment policy is similar to that employed in Action 904 and is not described repeatedly.

In Action 1104, the control module sends the resource assignment policy obtained in Action 1103 to the centralized session control unit in the PoC control server, and the centralized session control unit forwards the resource assignment policy to the execution module corresponding to the current session.

As can be seen from FIG. 10, the resource assignment policy can also be sent from the control module directly to the execution module. In such a case, the request for fetching a resource assignment policy in Action 1102 should contain the address of the execution module so that the control module may send the resource assignment policy to the execution module according to the address of the execution module. And Action 1104 is accordingly replaced by Action 1104'. In Action 1104', the control module sends the resource assignment policy directly to the execution module according to the address of the execution module in the request for fetching a resource assignment policy in Action 1102.

In Action 1105, the execution module sends a resource assignment indication to the media processing unit in the PoC control server according to the logic described in the received resource assignment policy, and the media processing unit can assign the communication resources of the media transmission in the current PoC service according to the resource assignment indication from the execution module. At the same time, the execution module may send a resource assignment notification to the UE(s) of the current PoC service. The process of sending the resource assignment indication and the resource assignment notification by the execution module is similar to that in Action 906 and therefore is not described.

According to the method in accordance with embodiments of the present invention, not only the resource assignment policy can be provided for the current PoC service in the session setup processes shown in FIGS. 9 and 11, but also resource assignment policy update can be provided to the user and/or the operator. Resource assignment policy synchronization between the communication system and the external communication system can also be realized. In other words, the method in accordance with embodiments of the present invention may further include the following: a UE and/or an operation and administration system updates, through a control module, resource assignment policies in a database connected to the control module, e.g., creates, modifies and deletes a resource assignment policy; and/or the external communication system exchanges, through a control module, resource assignment policies with a database connected to the control module in order to synchronize the resource assignment policies with that of the external communication system. The details of the process are given in the descriptions of the networking structures in FIGS. 8 and 10, and are not repeated.

As can be seen from the descriptions of the FIGS. 8 to 11, no matter which networking structure is adopted by the system in accordance with embodiments of the present invention, the system is able to select a resource assignment policy according to the demands of the current PoC service session, and manage the communication resource assignment of the current PoC service according to the resource assignment policy. If the user wants to change a resource assignment policy, the user just needs to input a new policy index, or modify the resource assignment policy through UE or an operation and administration system. Therefore, the user and the operator can actually manage the communication resource assignment dynamically according to the service needs.

FIGS. 7 to 11 are described with the PoC service communication system as an example. However, when the present invention is applied to another type of communication system, the networking structure of the resource assignment policy system and the communication resource assignment process are still basically the same, except that the media processing unit and the centralized session control unit are integrated into a different entity. For example, in a conference service communication system, the media processing unit is integrated into a Media Resource Function (MRF) entity, and the centralized session control unit is integrated into a conference server. Though the media processing unit and the centralized session control unit are integrated into different entities in different types of communication systems, the structure of the resource assignment policy system and the overall process of the method for managing the communication resource assignment are substantially unchanged. Therefore, the applications of the present invention to other types of communication systems are not described further but are still covered in the protection scope of the present invention. The resource assignment policy provision system in accordance with an embodiment of the present invention can be implemented by XDMSs. In other words, the resource assignment policy provision system shown in FIG. 7 and the control modules in the resource assignment policy control groups shown in FIGS. 8 to 11 may be implemented by XDMSs.

To sum up, with the system and method in accordance with embodiments of the present invention, the communication system ceases assigning communication resources according to a fixed policy in the centralized session control unit, but manages all needed resource assignment policies through the resource assignment policy system. The resource assignment policy system fetches a resource assignment policy in real time according to the need for the multiparty communication service which is being set up currently. And the media processing unit in the communication system is managed to assign communication resources according to the fetched resource assignment policy. In this manner, the communication resources can be assigned flexibly and the functions provided by communication services can be diversified. The users and operators may modify the existing resource assignment policies and create new resource assignment policies through the operation and administration system, so that the resource assignment policies can be extended freely. It is therefore possible to create diversified extensions of communication service functions. Hence the system and method of the embodiments of the present invention is a breakthrough in the communication resource assignment technique of the communication system.

The resource assignment policy system provided by the present invention is able to interact with the UE, the operation and administration system and the external communication system so as to exchange the resource assignment policies. Therefore, users or operators can create/modify resource assignment policies dynamically, and the resource assignment policy system can synchronize the resource assignment policies with the resource assignment policies of the external communication system.

The above are only preferred embodiments of the present invention and are not for use in limiting the protection scope of the present invention. All the modifications, equivalent replacements or improvements within the spirit and principles of the invention shall be included in the protection scope of the present invention.

What is claimed is:

1. A method for managing communication resource assignment in a resource assignment policy system, comprising:

receiving a first session setup request for a multiparty communication service from a first User Equipment, UE; wherein the first session setup request carries a first policy index or a first group identifier;

determining a first resource assignment policy based on the first policy index or the first group identifier;

assigning, according to the first resource assignment policy, communication resources to the first UE;

receiving a second session setup request for a multiparty communication service from a second User Equipment, UE; wherein the second session setup request carries a second policy index or a second group identifier;

determining a second resource assignment policy based on the second policy index or the second group identifier; and assigning, according to the second resource assignment policy, communication resources to the second UE.

2. The method of claim 1, further comprising:

determining whether the first resource assignment policy determined is acceptable; and assigning communication resources to the first UE according to the first resource assignment policy if the first resource assignment policy is acceptable; and determining whether the second resource assignment policy determined is acceptable; and assigning communication resources to the second UE according to the second resource assignment policy if the second resource assignment policy is acceptable.

3. The method of claim 1, further comprising:

determining whether the first resource assignment policy determined is acceptable; and refusing to set up a multiparty communication service for the first UE if the first resource assignment policy is not acceptable; and determining whether the second resource assignment policy determined is acceptable; and refusing to set up a multiparty communication service for the second UE if the second resource assignment policy is not acceptable.

4. The method of claim 1, wherein the multiparty communication service comprises one of a Push-to-talk over Cellular (PoC) service, a message service and a conference service.

5. A method for managing communication resource assignment in a resource assignment policy system, comprising:

determining a resource assignment policy based on information for requesting resource assignment policy in a session setup request for a multiparty communication service from a User Equipment, UE;

assigning, according to the resource assignment policy, communication resources to UEs of the multiparty communication service set up according to the session setup request;

determining whether the resource assignment policy determined is acceptable;

negotiating with the UE to obtain a second resource assignment policy or determining a default resource assignment policy corresponding to the multiparty communication service set up according to the session setup request if the resource assignment policy is not acceptable; and assigning the communication resources to the UEs of the multiparty communication service according to the second resource assignment policy or the default resource assignment policy.

6. A method for managing communication resource assignment in a resource assignment policy system, comprising:

modifying a resource assignment policy based on information for requesting resource assignment policy in a session modification request for modifying a resource assignment policy in a multiparty communication service from a User Equipment, UE; and assigning the communication resources to UEs of the multiparty communication service according to the modified resource assignment policy.

7. The method of claim 6, wherein the information for requesting resource assignment policy in the session modification request comprises a new resource assignment policy requested by the UE; and the modifying a resource assignment policy based on information for requesting resource assignment policy comprises:

fetching the new resource assignment policy from the session modification request; and replacing the resource assignment policy of the multiparty communication service by the new resource assignment policy.

8. The method of claim 6, wherein the information for requesting resource assignment policy in the session modification request comprises a policy index;

the modifying a resource assignment policy based on information for requesting resource assignment policy comprises:

determining a new resource assignment policy according to the policy index, and replaces the resource assignment policy of the multiparty communication service by the new resource assignment policy from resource assignment policies pre-saved.

9. The method of claim 6, wherein the information for requesting resource assignment policy in the session modification request comprises parameters of a new resource assignment policy; and the modifying a resource assignment policy based on information for requesting resource assignment policy comprises:

modifying the resource assignment policy based on the parameters of the new resource assignment policy; and assigning the communication resources according to the modified resource assignment policy.

10. The method of claim 6, further comprising:

determining whether the modified resource assignment policy is acceptable; and assigning the communication resources to the UEs of the multiparty communication service according to the modified resource assignment policy if the modified resource assignment policy is acceptable.

11. The method of claim 6, further comprising:
determining whether the modified resource assignment policy is acceptable; and
refusing the modification if the modified resource assignment policy is not acceptable.

12. The method of claim 6, further comprising:
determining whether the modified resource assignment policy is acceptable;
negotiating with the UE to obtain a resource assignment policy that is acceptable and assigning the communication resources to the UEs of the multiparty communication service according to the resource assignment policy that is acceptable if the resource assignment policy is not acceptable.

13. The method of claim 6, wherein the multiparty communication service comprises one of a Push-to-talk over Cellular (PoC) service, a message service and a conference service.

14. A resource assignment policy system, configured in a communication system, the communication system comprising a centralized session control unit and a media processing unit, comprising:
a resource assignment policy provision subsystem, for providing a first resource assignment policy based on a first policy index or a first group identifier included in a first session setup request or a first session modification request from a User Equipment, UE, and for providing a second resource assignment policy based on a second policy index or a second group identifier included in a second session setup request or a second session modification request from a UE, via the centralized session control unit for requesting a resource assignment policy; and
a resource assignment policy execution subsystem, for managing the media processing unit to assign communication resources according to the first resource assignment policy and the second resource assignment policy received from the resource assignment policy provision subsystem.

15. The system of claim 14, wherein the resource assignment policy provision group is implemented by XDMS.

16. The system of claim 14, wherein the communication system is a Push-to-talk over Cellular (PoC) service communication system, and the centralized session control unit and the media processing unit corresponding to the centralized session control unit are integrated into a PoC control server of a PoC service; or
the communication system is a conference service communication system, and the media processing unit is integrated into a Media Resource Function (MRF) and the centralized session control unit is integrated into a conference server.

17. A resource assignment policy system, configured in a communication system, the communication system comprising a centralized session control unit and a media processing unit, a resource assignment policy provision subsystem, for providing a resource assignment policy based on information included in a session setup request or a session modification request from a User Equipment, UE, via the centralized session control unit for requesting a resource assignment policy; and
a resource assignment policy execution subsystem, for managing the media processing unit to assign communication resources according to the resource assignment policy received from the resource assignment policy provision subsystem, wherein the resource assignment policy provision subsystem comprises:
a resource assignment policy database group, for saving resource assignment policies; and
a resource assignment policy control group, for receiving the information for requesting resource assignment policy from the centralized session control unit, fetching the resource assignment policy from the resource assignment policy database group, sending the resource assignment policy to the resource assignment policy execution subsystem, and updating the resource assignment policies saved in the resource assignment policy database group.

18. The system of claim 17, wherein the resource assignment policy control group comprises at least one control module;
the resource assignment policy database group comprises at least one database for saving the resource assignment policies; and
the resource assignment policy execution subsystem comprises at least one execution module; wherein
the control module is configured for receiving the information for requesting resource assignment policy from the centralized session control unit, fetching the resource assignment policy from a database connected to the control module, sending the resource assignment policy to an execution module corresponding to the control module, and interacting with the UE to exchange the resource assignment policies and updating the resource assignment policies saved in the database connected to the control module; and
the execution module is configured for sending, according to the resource assignment policy, a resource assignment indication to the media processing unit in the communication system to manage the media processing unit to assign the communication resources.

19. The system of claim 18, wherein the resource assignment policy control group further comprises at least one proxy control module; and
the proxy control module is configured for sending the information for requesting resource assignment policy received from the centralized session control unit to the control module corresponding to the centralized session control unit, sending the resource assignment policy from the control module to the execution module, and forwarding the resource assignment policies exchanged between the control module and the UE.

20. The system of claim 17, wherein the control module is implemented by Extensible Markup Language (XML) Document Management Server (XDMS).

* * * * *